United States Patent
Beaudin et al.

(10) Patent No.: US 11,638,154 B2
(45) Date of Patent: Apr. 25, 2023

(54) PREVENTION OF DENIAL OF SERVICE ATTACKS USING FTM REQUESTS

(71) Applicant: Hewlett Packard Enterprise Development LP, Houston, TX (US)

(72) Inventors: Andre Beaudin, Montreal (CA); Omar El Ferkouss, St. Laurent (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 239 days.

(21) Appl. No.: 17/205,043

(22) Filed: Mar. 18, 2021

(65) Prior Publication Data

US 2022/0303776 A1 Sep. 22, 2022

(51) Int. Cl.

| | | |
|---|---|---|
| *H04W 12/122* | (2021.01) | |
| *H04W 64/00* | (2009.01) | |
| *H04W 12/06* | (2021.01) | |
| *H04L 9/40* | (2022.01) | |
| *H04L 61/50* | (2022.01) | |

(Continued)

(52) U.S. Cl.
CPC ........... *H04W 12/122* (2021.01); *H04L 61/50* (2022.05); *H04L 63/0876* (2013.01); *H04L 63/1458* (2013.01); *H04W 12/06* (2013.01); *H04W 64/00* (2013.01); *H04L 2101/622* (2022.05); *H04W 88/08* (2013.01)

(58) Field of Classification Search
CPC ... H04W 12/122; H04W 12/06; H04W 12/71; H04W 12/088; H04W 64/00; H04W 88/08; H04W 84/12; H04L 63/0876; H04L 63/1458; H04L 63/101; H04L 61/50

See application file for complete search history.

(56) References Cited

U.S. PATENT DOCUMENTS

| | | |
|---|---|---|
| 9,699,052 B2 | 7/2017 | Aldana et al. |
| 9,854,468 B2 | 12/2017 | Chu et al. |
| 9,906,916 B2 | 2/2018 | Steiner |

(Continued)

OTHER PUBLICATIONS

López-Pastor, J.A.; Arques-Lara, P.; Franco-Peñaranda, J.J.; García-Sánchez, A.J.; Gómez-Tornero, J.L.; "Wi-Fi RTT-Based Active Monopulse RADAR for Single Access Point Localization," in IEEE Access, vol. 9, pp. 34755-34766, 2021, doi: 10.1109/ACCESS.2021.3062085.*

(Continued)

*Primary Examiner* — Victor Lesniewski
(74) *Attorney, Agent, or Firm* — Hewlett Packard Enterprise Patent Department

(57) ABSTRACT

Examples of techniques for handling fine time measurement ranging requests are described. In an example, an access point (AP) may receive a ranging request for initiating a Fine Timing Measurement (FTM) session. Responsive to determining that the client device is associated with the AP, it is determined that the ranging request is received after a threshold time from expiry of an FTM burst period of the client device. It is determined that the ranging request is within an FTM acceptance threshold of the AP. A number of consecutive unsuccessful FTM bursts between the AP and the client device is determined. In response to determining that the number of consecutive unsuccessful FTM bursts is less than an unsuccessful burst threshold of the AP, the FTM session may be initiated based on the ranging request.

20 Claims, 5 Drawing Sheets

(51) Int. Cl.
*H04W 88/08* (2009.01)
*H04L 101/622* (2022.01)

(56) References Cited

U.S. PATENT DOCUMENTS

| | | | |
|---|---|---|---|
| 9,935,756 B2 | 4/2018 | Marri Sridhar et al. | |
| 11,297,591 B1* | 4/2022 | El Ferkouss | H04W 76/10 |
| 2016/0183171 A1* | 6/2016 | Hareuveni | H04W 64/00 370/328 |
| 2016/0345277 A1* | 11/2016 | Segev | H04W 56/001 |
| 2017/0118772 A1* | 4/2017 | Abinader, Jr. | G01S 5/0072 |
| 2017/0142608 A1* | 5/2017 | Vamaraju | G01S 13/767 |
| 2017/0188300 A1 | 6/2017 | Eyal et al. | |
| 2017/0280414 A1* | 9/2017 | Gidvani | G01S 11/02 |
| 2018/0109970 A1* | 4/2018 | Chu | H04W 24/10 |
| 2018/0310194 A1* | 10/2018 | Yang | H04W 24/10 |
| 2019/0182674 A1* | 6/2019 | Li | G01S 13/767 |
| 2021/0051561 A1* | 2/2021 | Gupta | H04W 40/005 |
| 2021/0282108 A1* | 9/2021 | Smith | H04W 64/003 |
| 2021/0364597 A1* | 11/2021 | Sheriff | G01S 7/36 |
| 2022/0110084 A1* | 4/2022 | El Ferkouss | H04W 76/10 |

OTHER PUBLICATIONS

Huilla et al., "Indoor Localization with Wi-Fi Fine Timing Measurements Through Range Filtering and Fingerprinting Methods," 2020 IEEE 31st Annual International Symposium on Personal, Indoor and Mobile Radio Communications, 2020, pp. 1-7, doi: 10.1109/PIMRC48278.2020.9217193.*

* cited by examiner

PREVENTION OF DENIAL OF SERVICE ATTACKS USING FTM REQUESTS

BACKGROUND

A computer network includes a variety of network devices, such as access points, controllers, gateways, switches, etc., which perform different networking operations, such as network access, authentication, and routing network traffic to provide connectivity. A Wireless Local Area Network (WLAN) may include a plurality of Access Points (APs), as elements of the WLAN. These APs may be deployed in a network.

Client devices, such as laptops, personal computers, smartphones, etc. connect to network devices to exchange data with the network. Various positioning techniques can be employed for determining the position of a wireless communication device (e.g., a wireless local area network (WLAN) device) based on receiving wireless communication signals. For example, positioning techniques can utilize one or more Fine Timing Measurement (FTM) sessions between a client device and one or more access points. FTM-based positioning techniques may utilize one or more message exchanges to determine time of arrival (TOA), the round-trip time (RTT), or the time difference of arrival (TDOA) of the wireless communication signals. The RTT, TOA, and TDOA information may be used to determine the position of a wireless communication device in a wireless communication network. These factors may be used in conjunction with the known positions of one or more stations in the wireless network to derive the location of the wireless communication device.

BRIEF DESCRIPTION OF DRAWINGS

The present disclosure, in accordance with one or more various embodiments, is described in detail with reference to the following figures. The figures are provided for purposes of illustration only and merely depict typical or example embodiments.

Figure 1:
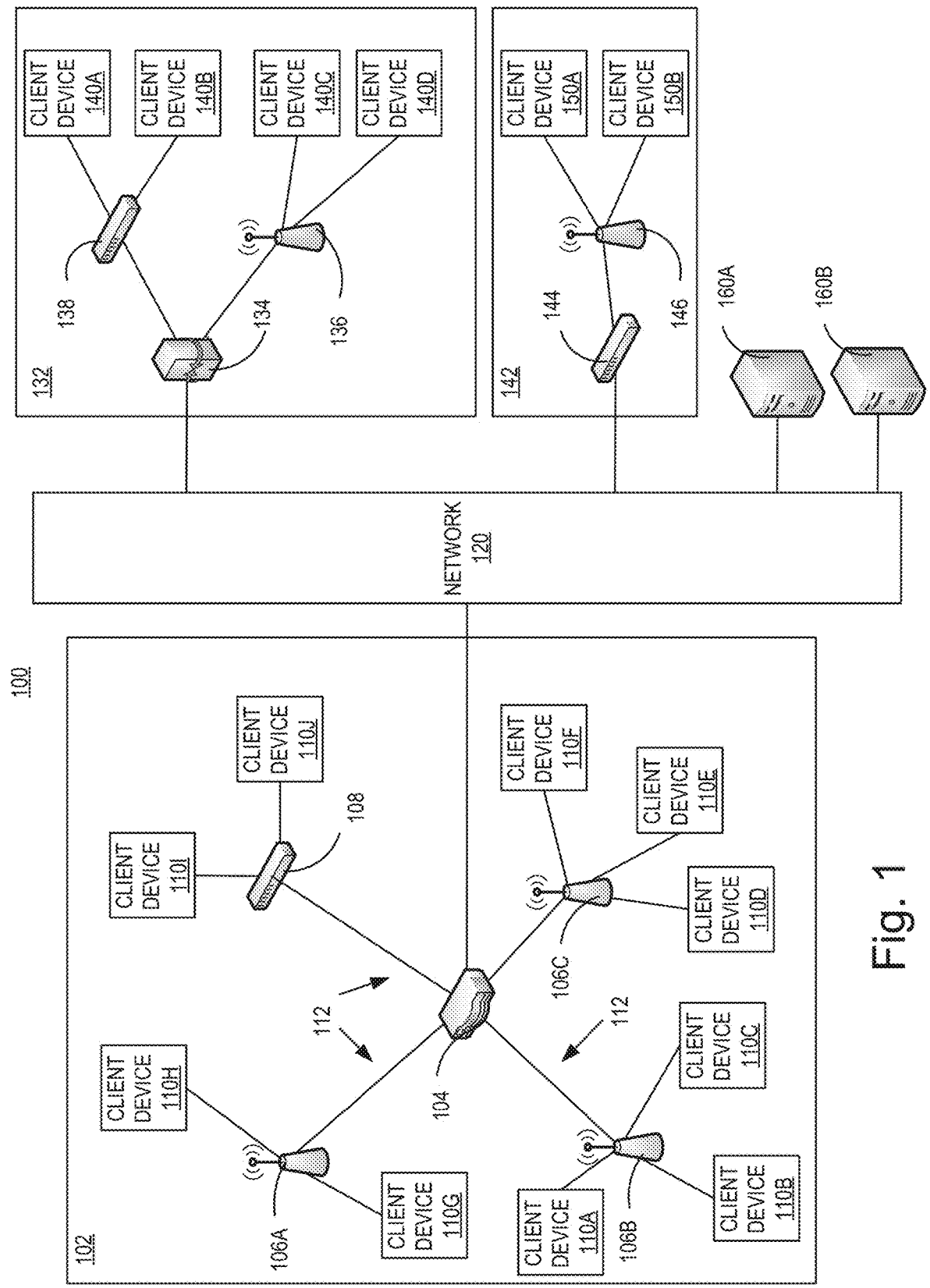
FIG. 1 illustrates an example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Fine Timing Measurement (FTM) may be used by wireless stations (STAs) and wireless access points (AP), to estimate the distance between them. FTM may allow a client device or AP to determine its distance from another AP by measuring the duration of a radio wave transmission time frame traveling back and forth between the client device or AP and the other AP.

In an example, for measuring the distance between a client device and an AP using FTM, the client device may send a ranging request to the AP to initiate an FTM session. In the FTM session, exchange of FTM messages occur between the client device and the AP based on which the distance between them is estimated. The AP receiving the ranging request allocates its computing resources and time slots for handling the FTM message exchanges in the FTM session. As more ranging requests are received by the AP, greater amount of computing resources and time slots of the AP may be consumed which may increase the processing load of the AP for handling the ranging requests.

Perpetrators may use ranging requests for initiating the FTM sessions to launch a Denial of Service (DoS) attack towards a targeted AP. The targeted AP may be flooded with superfluous ranging requests (from one or more clients) in an attempt to overload the AP and prevent other legitimate functions (such as providing enterprise services, servicing connected stations and delivering high priority traffic, scanning the network, etc.) of the AP from being fulfilled. In the traditional FTM framework there exists no means for preventing such DoS attacks using FTM ranging requests.

Further, an AP receiving a ranging request from the client device or from another AP may not be able to establish a successful FTM burst with the client device. In an example, the AP may respond with invalid/bad bursts due to high processing load at the AP, poor channel quality, mismatch of FTM parameters, or Non-line of sight (NLOS) propagation. On receiving the invalid/bad bursts from the AP, the initiating client device may continue sending ranging requests although the AP may not be able to establish a successful FTM burst. This may cause flooding of ranging requests at the AP thereby overloading the AP and preventing other functions of the AP, such as traffic forwarding and network management. This may also cause the AP to lose airtime (which could have otherwise been used for servicing other stations for traffic/FTM, etc.) by being occupied in initiating FTM session which the AP is unable to establish.

The present disclosure includes techniques of selectively allowing ranging requests from stations, based on certain criteria. In the present disclosure, ranging requests received by an AP from its associated clients are selectively processed. Consider that the AP is part of an AP cluster. In an example, the AP cluster is a dynamic, configuration-aware group of APs in the same subnet of a network. The AP cluster provides a single point of administration and enables the deployment of APs to be viewed as a single wireless network rather than a series of separate wireless devices. The APs in the AP cluster are managed by a single managed device and the client load is shared by all the APs in the cluster. A network subnet can have multiple AP clusters. In an example, each of the APs in the cluster maintains an admit list indicative of client devices connected to at least one AP in the AP cluster. When a client device gets connected to an AP in the AP cluster, then the MAC address of the client device is included in the admit list which is published among all the APs in the cluster. Based on the MAC address of the client it is checked whether the client is connected with the AP or included in the admit list. For a ranging request from a client device connected with the AP or included in the admit list, it is determined that the ranging request is received after a threshold time from expiry of an FTM burst period of the client device. Subsequently, it is determined that the ranging request is within an FTM acceptance threshold of the AP. The FTM acceptance threshold is indicative of a maximum number of ranging requests from the client device that may be accepted by the AP over a time interval. On determining that the ranging request is within the predefined threshold, a number of consecutive unsuccessful FTM bursts between the AP and the client device is determined. In response to determining that the number of consecutive unsuccessful FTM bursts is less than an unsuccessful burst threshold of the AP, the FTM session is initiated based on the ranging request.

Thus, in the present disclosure a ranging request is processed and an FTM session may be initiated based on the ranging request, if the above-mentioned conditions are fulfilled. In an example, ranging requests from clients not associated with the AP or not included in the admit list may be rejected. Also, since the FTM session is initiated, in response to determining that the number of consecutive unsuccessful FTM bursts is less than the unsuccessful burst threshold, incessant ranging requests from client devices, when the AP is unable to establish a successful burst instance, may be prevented. By processing ranging requests from associated client devices once the above-mentioned conditions are fulfilled, superfluous ranging requests from perpetrators of DoS attacks may also be reduced. Also, client devices sending ranging requests inspite of receiving failed/bad bursts or no response from the AP may be prevented from being processed by the AP, thereby avoiding overloading of the AP with ranging requests. This may enable the AP to efficiently allocate its computing resources for its routine non-FTM functions, such as providing enterprise services, servicing connected stations and delivering high priority traffic, scanning the network, etc. Thus, a balanced distribution of computing resources and time slots of the AP for FTM and non-FTM functions may be achieved.

Allowing ranging requests only from clients connected with at least one AP in the AP cluster based on certain criteria being fulfilled differs from traditional FTM techniques in several ways. For example, in traditional FTM techniques, the AP receiving the ranging request may not check whether the ranging request is originating from an associated client, but rather allow ranging requests from any client device even if it is not associated with the AP or any of the APs in its cluster. This traditional system would not determine that the ranging request is received after a threshold time from expiry of an FTM burst period of the client device, or that the ranging request is within an FTM acceptance threshold, or whether the number of consecutive unsuccessful FTM bursts is less than an unsuccessful burst threshold of the AP. Rather, the AP in the traditional system may make attempts to initiate an FTM session directly on receiving a ranging request from a client device, which may leave the AP exposed to DoS attacks and/or flooding with FTM requests.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

The controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like. Client devices may also be referred to as stations (STA).

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. The APs 106a-c may control network access of the client devices 110a-h and may authenticate the client devices 110a-h for connecting to the APs and through the APs, to other devices within the network configuration 100. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a-j, 140a-d, 150a-b may request and access the multimedia content provided by the content servers 160a-b.

Figure 2:
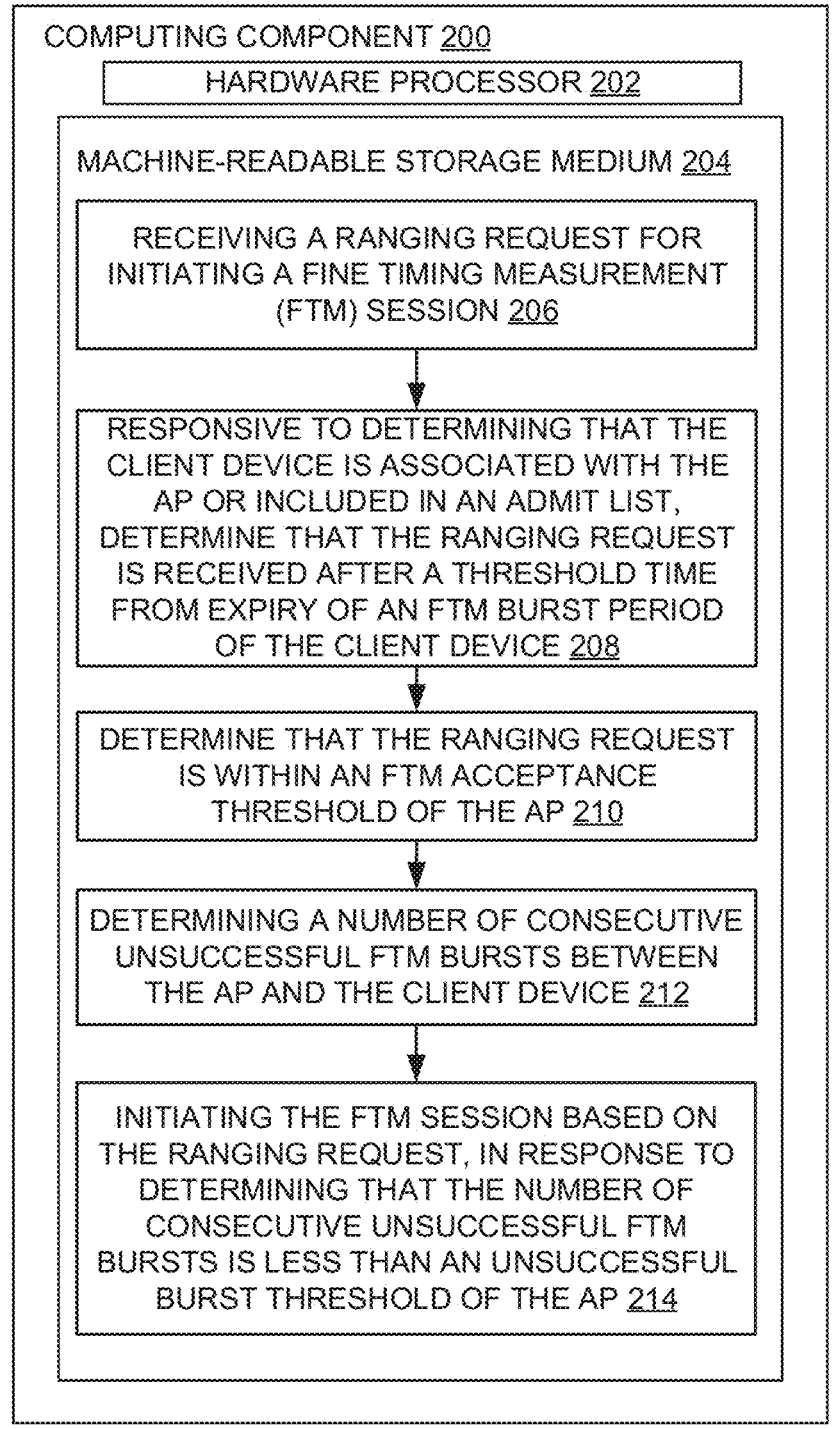
FIG. 2 is a block diagram of an example computing component or device for handling FTM requests in accordance with an embodiment.

FIG. 2 is a block diagram of an example computing component or device 200 for handling FTM requests, in accordance with an embodiment. In an example, the computing component 200 may function as a network device, as referred to in embodiments described herein. Examples of the network device may include APs, layer 3 switches, and routers. In another example, the computing component 200 may function as a client device, such as a computer, a smartphone, etc., connecting to the network device.

In the example implementation of FIG. 2, the computing component 200 includes a hardware processor, 202, and machine-readable storage medium, 204. Hardware processor 202 may be one or more central processing units (CPUs), semiconductor-based microprocessors, and/or other hardware devices suitable for retrieval and execution of instructions stored in machine-readable storage medium, 204. Hardware processor 202 may fetch, decode, and execute instructions, such as instructions 206-214, to control processes or operations for handling ranging requests for initiating an FTM session. As an alternative or in addition to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 204, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 204 may be a non-transitory storage medium, where the term "non-transitory" does not encompass transitory propagating signals. As described in detail below, machine-readable storage medium 204 may be encoded with executable instructions, for example, instructions 206-214.

Further, although the steps shown in FIG. 2 are in an order, the shown order is not the only order in which the steps may be performed. Any step may be performed in any order, at any time, may be performed repeatedly, and/or may be performed by any suitable device or devices. The process shown in FIG. 2 is also discussed in FIG. 3, at a differing level of detail.

In step 206, the computing component/device 200 receives a ranging request for initiating an FTM session. The FTM session may include an exchange of multiple message frames between an initiating WLAN station (STA) and a responding STA. In an example, the initiating WLAN station may be an AP or a client device, such as a laptop, desktop, smartphone, etc. The computing component/device 200 may be the responding STA. Examples of the responding STA may include an AP. In an example, a client device may attempt to establish an FTM session with the AP to determine a distance between the client device and the AP. In an example, the client device may be previously connected with the AP receiving the ranging request. In another example, the client device may be connected with at least one AP in an AP cluster which includes the AP receiving the ranging request. If the client device is connected to one of the APs in the AP cluster, a MAC address of the client device may be included in an admit list. The admit list is indicative of client devices connected to at least one AP in the AP cluster. In yet another example, the client device may send a connection request to the AP. The AP may perform an authentication of the client device before allowing the client device to connect with the AP. Once successfully authenticated, the client device may be connected to the AP. Alternatively, the client device may also be a client device not connected/associated with the AP. Although, in the description herein, the ranging request is considered to have originated from a client device, in an example, the ranging request may also originate from another AP.

In step 208, responsive to determining that the client device is connected with the AP or is included in the admit list, the computing device 200 may determine whether the ranging request is received after a threshold time from expiry of an FTM burst period of the client device. The interval from the beginning of one burst instance to the beginning of the following burst instance is referred to as the FTM burst period. Time windows during which FTM frames are exchanged between an FTM initiator, such as a client device and an FTM responder, such as an AP are called burst instances. In an example, for enterprise AP, an FTM initiating STA could be at a fixed position or moving at moderate speeds, such as when a user is walking/running with a mobile device (STA). Thus, depending on the acceptable precision of measurement and typical walking/running speeds, a minimum delay between each burst period between the STA and the AP may be determined. The STA is expected to perform the FTM message exchanges in bursts according to the minimum delay between each burst period. In an example, the threshold time from expiry of an FTM burst period of the client device may be defined as a function of the minimum delay between each burst period between the STA and the AP. Based on the initiating STA information, the type of station whether fixed or mobile may also be determined. Thus, by rejecting a ranging request received before the threshold time from expiry of the FTM burst period of the client device, flooding of the AP with ranging requests may be avoided.

In step 210, it is determined that the ranging request is within an FTM acceptance threshold of the AP. The FTM acceptance threshold is indicative of a maximum number of ranging requests from the client device that may be accepted by the AP over an interval. For example, if the FTM acceptance threshold for a particular client device is set as 100 over an interval of 5 minutes, then in step 210 it may be checked whether the ranging request received by the AP is more than 100. If the ranging request received is less than or equal to the $100^{th}$ ranging request received within the interval of 5 minutes, then it is determined that the ranging request is within the FTM acceptance threshold.

In step 212, a number of consecutive unsuccessful FTM bursts between the AP and the client device is determined. In an example, an FTM burst instance may be identified as unsuccessful based on non-receipt of an acknowledgement to an FTM frame sent to the client device. In an example, the AP may send an invalid or bad burst in response to FTM frames received from the client device. On receipt of invalid or bad bursts, the FTM bursts may be understood to be unsuccessful.

In step 214, in response to determining that the number of consecutive unsuccessful FTM bursts is less than an unsuccessful burst threshold of the AP, the FTM session may be initiated based on the ranging request. The unsuccessful burst threshold may define a certain number of consecutive FTM bursts between an FTM initiator and an FTM responder which if unsuccessful, indicates that the FTM initiator and/or the FTM responder is not ready to initiate an FTM session.

Figure 3A:
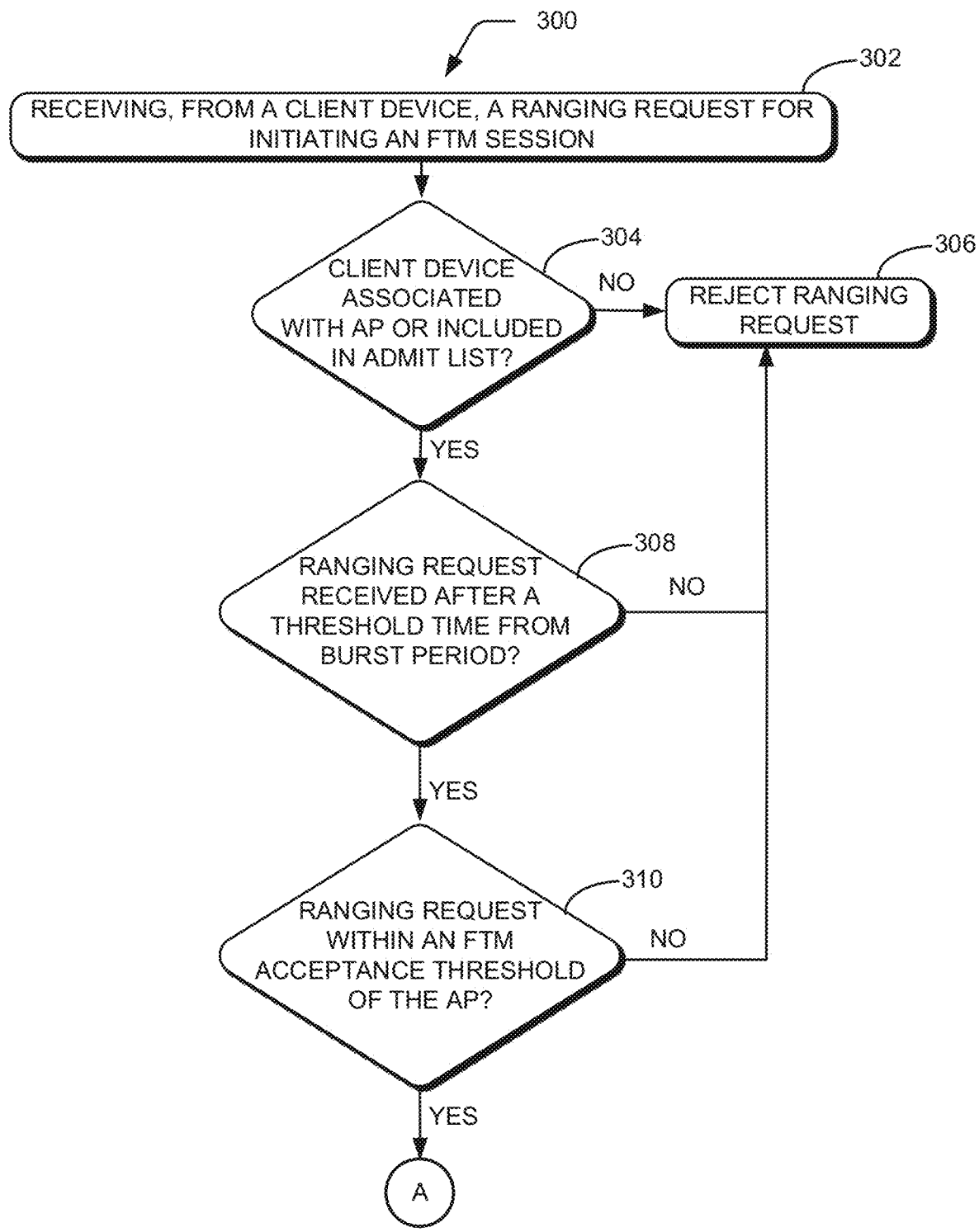
FIGS. 3A and 3B illustrate an example method for handling FTM requests in accordance with an embodiment.
Figure 3B:
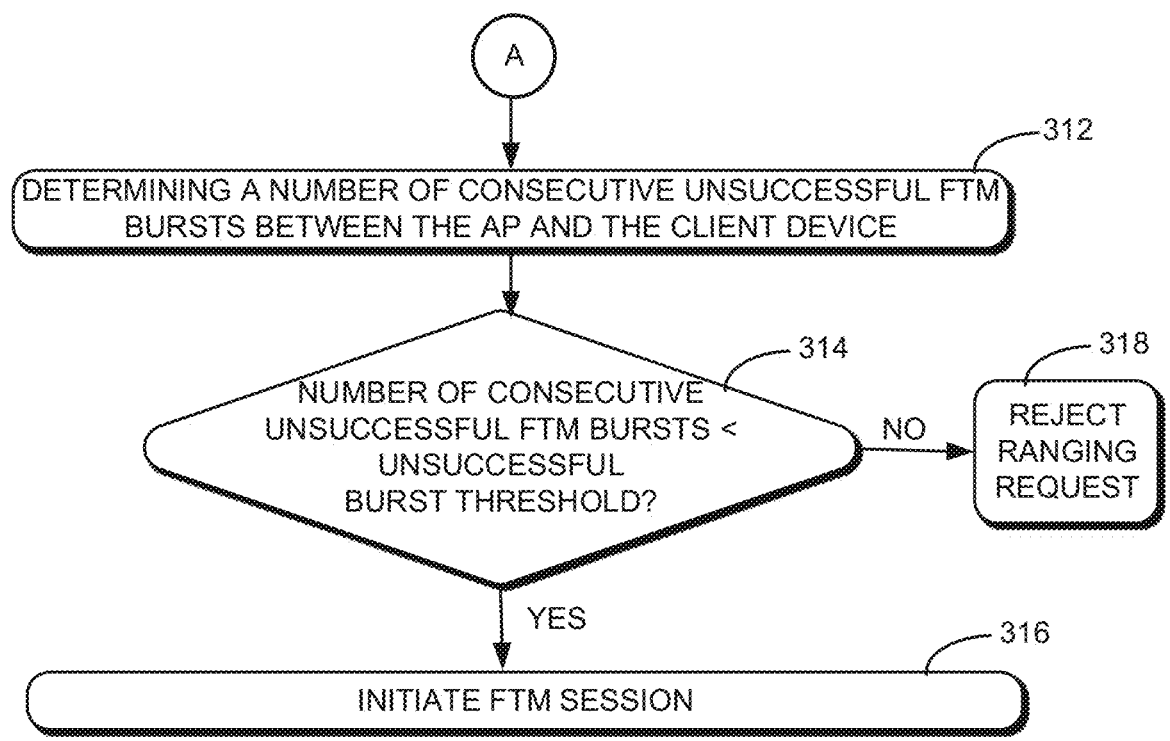

FIGS. 3A and 3B illustrate an example method 300 for handling FTM ranging requests in accordance with an embodiment. The method 300 may be executed by a network device, such as an AP, switch, or router. Although in the examples described herein, it is considered that the method 300 is implemented by a network device, however, the method 300 may also be implemented by client devices, such as personal computers, laptops, smartphones, etc. The steps of the method 300 as described herein can be performed mutatis mutandis by a client device. The method 300 can be implemented by processing resource(s) or computing device(s) through any suitable hardware, a non-transitory machine readable medium, or combination thereof. In an example, the method 300 may be performed by computer-readable instructions, which include instructions stored on a medium and executable by a processing resource, such as the hardware processor 202, of a computing device/component, such as the computing component 200. Further, although the method 300 is described in context of the aforementioned computing component 200, other suitable systems may be used for execution of the method 300. It may be understood that processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3A, at block 302, an AP, such as one of the APs 106a-c of FIG. 1, may receive a ranging request for initiating an FTM session from a client device, such as one of the client devices 110a-j of FIG. 1. Consider that the client devices 110a-j form an AP cluster. In an example, the client device 110a may send a ranging request to the AP 106a to measure a distance of the client device from the AP 106a. In an example, the client device 110a may be associated/connected with the AP 106a. The client device 110a may send a connection request to the AP 106a. The AP 106a may authenticate the client device 110a based on the connection request from the client device 110a. The connection request includes a Media Access Control (MAC) address of the client device 110a. The AP 106a may authenticate the client device 110a based on the MAC address. Responsive to successful authentication of the client device 110a, the client device gets associated or connected to the AP and the MAC address of the authenticated client device is added to an admit list. The admit list includes MAC addresses of client devices connected to at least one AP in the AP cluster. The admit list may be stored by the AP 106a and also shared among a group of neighbor APs, such as 106b to 106j, in the AP cluster. Based on the admit list, the neighbor APs, 106 b to 106j, in the AP cluster may process ranging requests from client devices. In another example, the client device 110a may be connected to any of the APs 106b to 106j in the AP duster and may send the ranging request to the AP 106a.

In an example, client devices may implement MAC randomization. Once such a client device, say client device 106a, is connected with the AP 106a or included in the admit list, the MAC address of the client device 106a does not alter while the client device 110a remains connected with the AP 106a or any of the APs 106b to 106j in the AP duster. Thus, while being connected with one AP (such as 106b) in the AP cluster, if the client device 110a sends a ranging request to another AP (such as 106a) in the AP cluster, the other AP (106a) may identify the client device 110a as an associated client device based on the MAC address of the client device 110a included in the admit list, thereby avoiding re-authentication of the client device 110a by the AP 106a. Thus, APs 106a to 106j) in the AP duster may process ranging requests from the client device 110a based on the admit list. Once the client device 110a disconnects from any one of the APs in the cluster, the MAC address of the client device is removed from the admit list. In an example, corresponding to each of the client devices in the admit list, an FTM acceptance threshold and an unsuccessful burst threshold may be stored in the AP cluster. In an instance, the AP 106a may initialize an FTM counter associated with the client device 110a on receiving the ranging request from the client device 110a. Initialization of the FTM counter includes storing a value for the FTM counter in the AP 106a. The FTM counter is indicative of FTM ranging requests received for the client device 110a over an interval. Thus, the FTM counter is a measure of how frequently an FTM ranging request from the client device 110a is served by the AP 106a.

On receiving the ranging request, at block 304, it is checked whether the client device 110a is connected with the AP 106a or included in the admit list. In an example, the AP 106a may compare the MAC address of the client device 110a with MAC addresses present in the admit list. Responsive to determining that the client device 110a is not connected with the AP 106a or not included in the admit list, ("No" branch from block 304), the ranging request from the client device 110a is rejected at block 306. Thus, FTM ranging requests only from authenticated clients connected to the AP or associated with the AP cluster are allowed, thereby reducing the chances of frivolous FTM requests from unauthorized devices.

At block 308, responsive to determining that the client device 110a is associated with the AP 106a or included in the admit list ("Yes" branch from block 304), the AP 106a may check whether the ranging request is received after a threshold time from expiry of an FTM burst period of the client device 110a. Thus, if the client device 110a has a previously existing FTM session with the AP 106a and the ranging request for initiating another FTM session is sent by the client device 110a, the AP 106a before allowing the ranging request determines that the ranging request is received after the threshold time from the expiry of the FTM burst period of the client device 110a. This may enable in reduction of overlapping ranging requests from the client device 110a to the AP 106a.

Responsive to determining that the ranging request is received before the threshold time from expiry of the FTM burst period ("No" branch from block 308), the ranging request is rejected by the AP 106a at block 306. Responsive to determining that the ranging request is received after the threshold time from expiry of the FTM burst period ("Yes" branch from block 308), it is checked at block 310 whether the ranging request is within an FTM acceptance threshold of the AP 106a.

Responsive to determining that the ranging request is within the FTM acceptance threshold of the AP 106a (Yes branch from block 310), a number of consecutive unsuccessful FTM bursts between the AP 106a and the client device 110a is determined at block 312. An unsuccessful FTM burst includes instances of non-receipt of an acknowledgement to an FTM frame sent to the client device. In an example, an unsuccessful burst counter corresponding to the client device 110a is incremented with occurrence of an unsuccessful FTM burst between the client device 110a and the AP 106a. The unsuccessful burst counter corresponding to the client device 110a indicative of the number of consecutive unsuccessful FTM bursts between the AP 106a and the client device 110a may be stored in the AP 106a.

At block 314, the number of consecutive unsuccessful FTM bursts is compared with an unsuccessful burst threshold. The unsuccessful burst threshold denotes a fixed number of consecutive FTM bursts between an FTM initiator and an FTM responder which if unsuccessful indicates that the FTM initiator and/or the FTM responder is not ready to initiate an FTM session.

Responsive to determining that the number of consecutive unsuccessful FTM bursts is less than the unsuccessful burst threshold ("Yes" branch from block 314), the AP may process the ranging request and initiate the FTM session at block 316. Alternatively, responsive to determining that the number of consecutive unsuccessful FTM bursts is greater than or equal to the unsuccessful burst threshold ("No" branch from block 314), the AP may reject the ranging request, at block 318. Thus, on fulfilling the conditions as mentioned in blocks 304, 308, 310, and 314, the ranging request is processed by the AP and the FTM session may be initiated, consequently reducing the chances of flooding of the AP with ranging requests and reducing the chances of DoS attacks using FTM ranging requests. This enables balanced distribution of computing resources of the AP for FTM and non-FTM functions.

Figure 4:
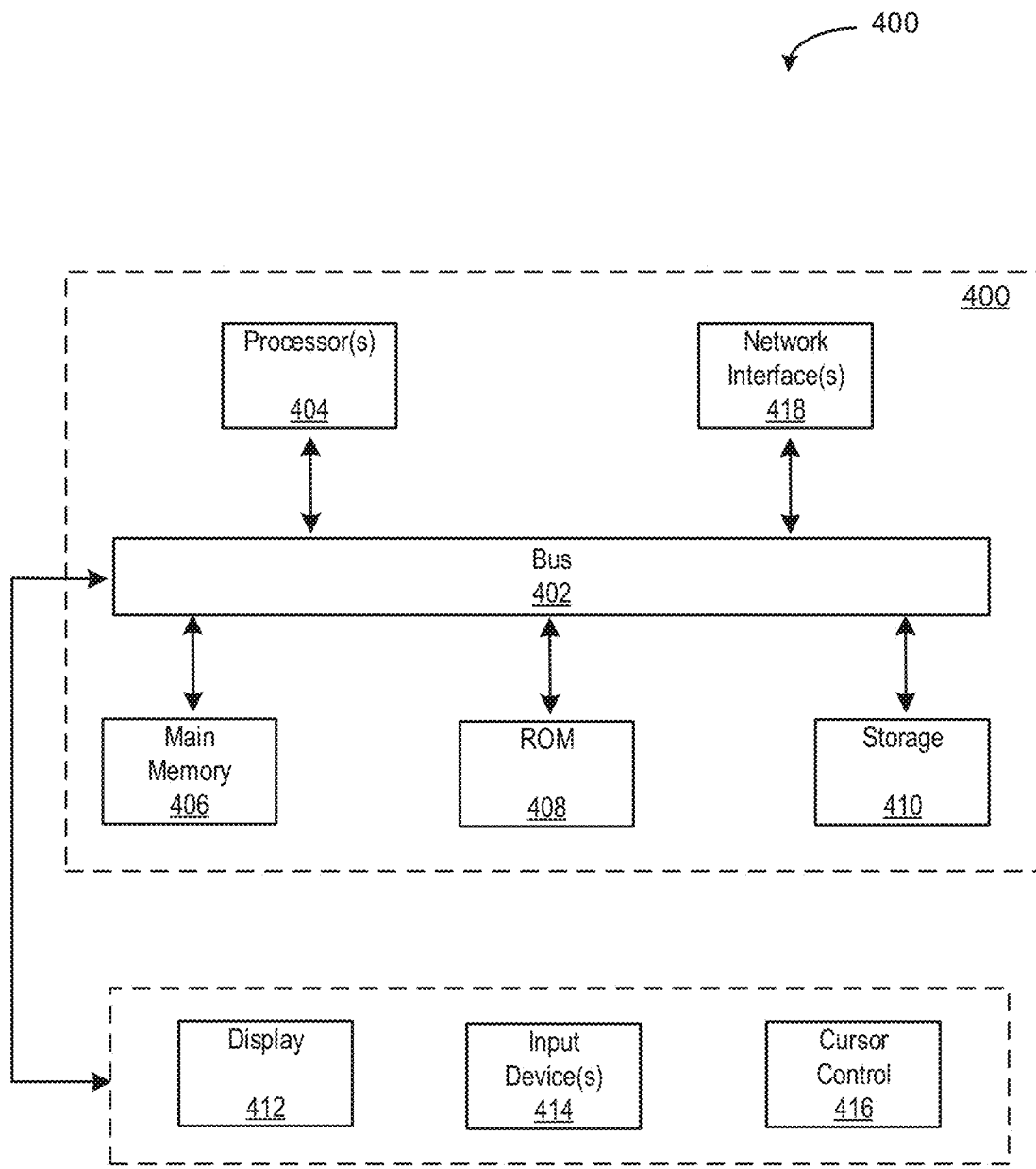
FIG. 4 depicts a block diagram of an example computer system in which the embodiments described herein may be implemented.

FIG. 4 depicts a block diagram of an example computer system 400 in which the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a liquid crystal display (LCD) (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Per, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

The computer system 400 also includes a communication interface 418 coupled to bus 402. Network interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, network interface 418 may be a local area network (LAN) card to provide a data communication connection to a compatible LAN (or WAN component to communicated with a WAN). Wireless links may also be implemented. In any such implementation, network interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418. The received code may be executed by processor 404 as it is received, and/or stored in storage device 410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method comprising:
   receiving, by an access point (AP) in an AP cluster, a ranging request for initiating a Fine Timing Measurement (FTM) session, the ranging request originating from a client device;
   responsive to determining that the client device is connected to the AP or that the client device is included in an admit list associated with the AP cluster, determining that the ranging request is received after a threshold time from expiry of an FTM burst period of the client device, wherein the admit list is indicative of client devices connected to at least one AP in the AP cluster;
   determining that the ranging request is within an FTM acceptance threshold of the AP;
   determining a number of consecutive unsuccessful FTM bursts between the AP and the client device; and
   initiating the FTM session based on the ranging request, in response to determining that the number of consecutive unsuccessful FTM bursts is less than an unsuccessful burst threshold of the AP.

2. The method of claim 1, wherein the FTM acceptance threshold is indicative of a maximum number of ranging requests from the client device that may be accepted by the AP over an interval.

3. The method of claim 1, further comprising:
   authenticating the client device based on a connection request from the client device, wherein the connection request includes a Media Access Control (MAC) address of the client device;
   responsive to successful authentication of the client device, adding the MAC address of the authenticated client device in the admit list; and
   sending the admit list to a group of neighbor APs in the AP cluster.

4. The method of claim 3, further comprising:
   removing the MAC address of the client device from the admit list, responsive to the client device being disconnected from the AP.

5. The method of claim 1, wherein the FTM burst period is the interval from the beginning of a burst instance to the beginning of a subsequent burst instance.

6. The method of claim 1, further comprising:
   identifying an FTM burst instance as unsuccessful based on non-receipt of an acknowledgement to an FTM frame sent to the client device.

7. The method of claim 1, further comprising:
   rejecting the ranging request responsive to one of:
      determining that the client device is not associated with the AP or not included in the admit list;
      determining that the ranging request is received before the threshold time from expiry of the FTM burst period of the client device;
      determining that the ranging request is beyond the FTM acceptance threshold; and
      determining that the number of consecutive unsuccessful FTM bursts is greater than the unsuccessful burst threshold.

8. An access point (AP) comprising:
   a processor; and a memory coupled to the processor, the memory storing instructions executable by the processor to:
  receive, from a client device, a ranging request for initiating a Fine Timing Measurement (FTM) session;
  responsive to determining that the client device is connected with the AP or that the client device is included in an admit list associated with an AP cluster of the AP, determine that the ranging request is received after a threshold time from expiry of an FTM burst period of the client device, wherein the admit list is indicative of client devices connected to at least one AP in the AP duster;
  determine that the ranging request is within an FTM acceptance threshold of the AP;
  determine a number of consecutive unsuccessful FTM bursts between the AP and the client device; and
  initiate the FTM session based on the ranging request, in response to determining that the number of consecutive unsuccessful FTM bursts is less than an unsuccessful burst threshold of the AP.

9. The AP of claim 8, wherein the FTM acceptance threshold is indicative of a maximum number of ranging requests from the client device that may be accepted by the AP over an interval.

10. The AP of claim 8, wherein the processor is further to:
  authenticate the client device based on a connection request from the client device, wherein the connection request includes a Media Access Control (MAC) address of the client device;
  responsive to successful authentication of the client device, add the MAC address of the authenticated client device in the admit list; and
  send the admit list to a group of neighbor APs in the AP cluster.

11. The AP of claim 10, wherein the processor is to remove the MAC address of the client device from the admit list, responsive to the client device being disconnected from the AP.

12. The AP of claim 10, wherein the FTM burst period is the interval from the beginning of a burst instance to the beginning of a subsequent burst instance.

13. The AP of claim 8, wherein the processor is further to:
  identify an FTM burst instance as unsuccessful based on non-receipt of an acknowledgement to an FTM frame sent to the client device.

14. The AP of claim 8, wherein the processor is to reject the ranging request responsive to one of:
  determining that the client device is not associated with the AP or not included in the admit list;
  determining that the ranging request is received before the threshold time from expiry of the FTM burst period of the client device;
  determining that the ranging request is beyond the FTM acceptance threshold; and
  determining that the number of consecutive unsuccessful FTM bursts is greater than the unsuccessful burst threshold.

15. A non-transitory computer-readable medium comprising computer-readable instructions, the computer-readable instructions when executed by a processor, cause the processor to:
  receive, by an access point (AP) from a client device, a ranging request for initiating a Fine Timing Measurement (FTM) session;
  responsive to determining that the client device is connected with the AP or that the client device is included in an admit list associated with an AP cluster of the AP, determine that the ranging request is received after a threshold time from expiry of an FTM burst period of the client device, wherein the admit list is indicative of client devices connected to at least one AP in the AP cluster, determine that the ranging request is within an FTM acceptance threshold of the AP;
  determine a number of consecutive unsuccessful FTM bursts between the AP and the client device; and
  initiate the FTM session based on the ranging request, in response to determining that the number of consecutive unsuccessful FTM bursts is less than an unsuccessful burst threshold of the AP.

16. The non-transitory computer-readable medium of claim 15, wherein the FTM acceptance threshold is indicative of a maximum number of ranging requests from the client device that may be accepted by the AP over an interval.

17. The non-transitory computer-readable medium of claim 15, wherein the computer-readable instructions further cause the processor to:
  authenticate the client device based on a connection request from the client device, wherein the connection request includes a Media Access Control (MAC) address of the client device;
  responsive to successful authentication of the client device, add the MAC address of the authenticated client device in the admit list; and
  send the admit list to a group of neighbor APs in the AP cluster.

18. The non-transitory computer-readable medium of claim 17, wherein the computer-readable instructions further cause the processor to, remove the MAC address of the client device from the admit list, responsive to the client device being disconnected from the AP.

19. The non-transitory computer-readable medium of claim 17, wherein the FTM burst period is the interval from the beginning of a burst instance to the beginning of a subsequent burst instance.

20. The non-transitory computer-readable medium of claim 17, wherein the processor is further to:
  identify an FTM burst instance as unsuccessful based on non-receipt of an acknowledgement to an FTM frame sent to the client device.

* * * * *